Patented Oct. 4, 1949

2,483,854

UNITED STATES PATENT OFFICE 2,483,854

PRODUCTION OF MODIFIED CARBAMIDE RESINS

Francis H. Snyder, New Rochelle, N. Y., assignor to Snyder Chemical Corporation, Bethel, Conn., a corporation of New York No Drawing. Application February 27, 1946, Serial No. 650,760

4 Claims. (Cl. 260—45.1)

This invention relates to the production of modified carbamide resins, more particularly to a phenol modified urea resin.

As is known, the relatively low cost coupled with generally good physical properties have established the urea formaldehyde resins in a prominent position in the resin field. As a class, however, the urea-aldehyde resins lack toughness, flexibility and do not possess particularly marked water resistance. These inherent and characteristic limitations have tended to restrict the use of such resins in technological fields where such factors as good water resistance coupled with flexibility and toughness are desiderata, such for example as in the paper coating and laminating field.

These disadvantages of the urea-aldehyde resins have been recognized and many suggestions have been made to improve their toughness and flexibility. The prior proposals for the most part involved the incorporation of other types of resins in the urea resin such, for example, as phenol-formaldehyde resins, alkyd resins and the like, to enhance some particular property of the urea resin. Numerous suggestions have been made on producing composite resins in which a phenol condensation product is a component. These prior suggestions generally involve the use of relatively large quantities of the phenol condensation product with consequent darker coloring and lowered light stability of the ultimate resin.

It has now been found that phenol modified urea resins may be produced having characteristics which render them particularly advantageous for use as coating and laminating material. The improved resins of the invention are characterized by improved flexibility and toughness and water resistance as compared to unmodified urea-formaldehyde resins and when employed as a coating on paper, for example, imparts increased stiffness. This enhancement of desired properties is achieved without any substantial sacrifice of the desirable characteristic light color of the urea-formaldehyde resin.

The invention comprehends the concept of simultaneously reacting a preponderant amount of urea and smaller but effective amounts of thiourea and phenol with formaldehyde under conditions controlled to produce a composite resin of improved properties. As will be seen the method involves a partial or first stage reaction or condensation under alkaline conditions followed by further reaction under acid conditions.

The following is one illustrative method of carrying out the invention. To 120 g. of urea there was added 12 g. of phenol, 10 g. of thiourea, 3.5 g. of borax and 350 g. of 37% Formalin. The mixture was refluxed for a period of 50 minutes and the batch was acidified to pH 6.3 by adding an acid catalyst. The acid catalyst employed was prepared by adding 25 ml. of Formalin to 100 ml. of 5% $NH_3$ and then adding 15 ml. of 85% $H_3PO_4$. After addition of the acid catalyst the batch was refluxed further until, on testing, a sample remained substantially clear on cooling.

In the event the ultimate product is over condensed because, for example, of the use of an, excess of the acid catalyst, it nevertheless may be readily reclaimed. This may be accomplished by thoroughly washing the gelled product with water and redispersing in aqueous Formalin.

Another effective method of producing the resin comprises refluxing a mixture of the constituents in the proportions of 240 g. of urea, 23.5 g. of phenol, 19 g. of thiourea, 7 g. of borax and 700 g. of 37% Formalin for a period of about 50 minutes. The batch is then acidified by adding a sufficient amount of the catalyst, described above, to adjust to about pH 6.3 while adding 30 additional parts of urea. The acidified batch is then refluxed again for a period of from 20 to about 50 minutes. The pH is finally adjusted to 7.5 to 8.0 by the addition of a suitable alkaline agent such as triethanolamine. The resin syrup is then concentrated to the viscosity which is desired.

As noted hereinbefore, the aqueous resin syrup may be employed directly as a coating or laminating material. For this purpose it has been found that the curing of the coated resin may be simply controlled by adding predetermined amounts of the described acid catalyst a short time before the application of the syrup to the material to be coated or laminated. For this purpose the catalyst is added in the proportion of about 1 to 5% by volume, the amount added depending on the rate of cure desired, the latter being proportional to the hydrogen ion concentration of the final product.

As will be appreciated the novel modified urea resins produced according to the invention although insoluble in water are readily dispersed in water. In some circumstances it may be advantageous to utilize syrups of lower viscosity as, for example, where more rapid penetration into a coated surface is desired. This may be done by careful slow addition of water or alcohol to the hot resin syrup. If the diluent is added too rapidly the resin coagulates. The rate of addition can readily be determined by simple preliminary trials.

In the event that the resin does coagulate on dilution it nevertheless may be readily reclaimed. This may be achieved by washing the doughy, coagulated mass with warm water, adding substantially 20% by weight of aqueous Formalin and heating at 100° C. for a period of between about 20 and 30 minutes to effect redispersion of the resin.

If the resin syrup to which the final amounts of the curing catalyst has been added has stood for sometime it will set up to a stiff gel and hence cannot readily be utilized as a coating material. This set resin may similarly be reclaimed. This may be accomplished by breaking up the gel, washing with warm water and then heated with aqueous Formalin in the manner described.

The aqueous dispersion of the improved resins, as indicated previously, may be utilized as a coating and laminating material. As has been explained, the viscosity may be adjusted within relatively wide limits to suitably adapt the solution for a particular application. In paper coating, for example, it has been found that aqueous dispersions containing about 50% solids are readily applied. Paper stock or formed paper products may be coated with the aqueous dispersion in any suitable manner and then heated to eliminate the water. This may be done for example, by passing the coated material through a tunnel drier or any other suitable drying apparatus. The resins described may be employed for laminating by adjusting the solution to the desired viscosity and applying by any desired standard techniques.

The paper products coated with the improved modified resin are characterized by an improved flexibility and water resistance as compared to products coated with the typical urea formaldehyde resins previously utilized. The novel resin coating also exhibits a greater toughness than earlier products which renders it useful for the coating of packaging cartons and the like, where scuff resistance is desired.

It will be understood that in the examples given the relative percentages of thiourea and phenol as compared to urea are not strictly critical and approximately 10% by weight of each of thiourea and phenol has been found to be a satisfactory proportion. These may be varied somewhat although approximately 10% of phenol and about 8% of thiourea appears to be the practical optimum for coating and laminating products.

While no attempt is made to explain the rationale or mechanism of reaction it would appear that the improved properties of the composite resin is due to some novel linkage involved in the composite resin. Whatever may be complex polymerization and condensations involved it is found, as pointed out, that by simultaneously reacting a preponderant amount of urea and smaller amounts of thiourea and phenol with formaldehyde sequentially in the presence of an alkaline catalyst and an acid catalyst a composite resin is produced which has the described properties of improved flexibility and toughness and enhanced water resistance.

It will be understood that the resin composition produced as described herein may be utilized, if desired, in other than aqueous dispersions. Thus, the product may be produced as a dry solid which can be used for molding and the like or it can be dissolved in suitable solvents and utilized in this form in the manner known in the art.

While improved methods of producing this novel resin have been described it will be understood that these are given as illustrative procedures for producing the described composite resin. Also, although the resin products produced have been described as valuable for coating and laminating these are given to illustrate the technical advantages of the novel resin in circumstances where the improved properties are desired.

I claim:

1. A method of producing coating compositions characterized by high flexibility and water resistance which comprises reacting urea and approximately 10% by weight thereof of each thiourea and phenol with an excess of formaldehyde in the presence of an alkaline catalyst for a period of approximately fifty minutes, then acidifying the mass and continuing the reaction for a period of from approximately 20 up to 50 minutes.

2. A method of producing acid curable modified urea resin coating compositions characterized by high flexibility and water resistance which comprises reacting substantially 240 parts of urea, 23.5 parts of phenol and 19 parts of thiourea with an excess of formaldehyde in the presence of 7 parts of borax for a period of about 50 minutes, acidifying the mass while adding 30 additional parts of urea and continuing the reaction for a period of from 20 to about 50 minutes.

3. A method of producing a curable modified urea resin coating composition characterized by a high flexibility and water resistance in the cured state which comprises reacting substantially 240 parts of urea, 24 parts of phenol and 20 parts of thiourea with 700 parts of Formalin in the presence of 7 parts of borax for a period of about 50 minutes, acidifying the mass to about pH 6.3 and continuing the reaction for a period of between about 20 and 50 minutes, then adjusting the batch to alkalinity and concentrating to a final dispersion containing about 50% solids.

4. The product produced by the process of claim 1.

FRANCIS H. SNYDER.

REFERENCES CITED

The following references are of record in the file of this patent:

UNITED STATES PATENTS

| Number | Name | Date |
|---|---|---|
| 2,205,427 | Loos | June 25, 1940 |

FOREIGN PATENTS

| Number | Country | Date |
|---|---|---|
| 740,250 | France | Jan. 23, 1933 |
| 850,377 | France | Dec. 15, 1939 |
| 518,858 | Great Britain | Mar. 8, 1940 |

OTHER REFERENCES

Ser. No. 237,057, Greth (A. P. C.), published April 20, 1943.